United States Patent [19]

Cooney et al.

[11] Patent Number: 4,836,977
[45] Date of Patent: Jun. 6, 1989

[54] STANDARDIZED REDUCED LENGTH BURNABLE ABSORBER RODS FOR A NUCLEAR REACTOR

[75] Inventors: Barry F. Cooney, Pittsburgh; Thomas M. Camden, Jr., Washington, both of Pa.

[73] Assignee: Westinghouse Electric Corp., Pittsburgh, Pa.

[21] Appl. No.: 89,202

[22] Filed: Aug. 25, 1987

Related U.S. Application Data

[62] Division of Ser. No. 718,902, Apr. 1, 1985, Pat. No. 4,728,487.

[51] Int. Cl.⁴ .............................................. G21C 7/10
[52] U.S. Cl. .................................................. 376/333
[58] Field of Search .............. 376/327, 353, 333, 426, 376/420, 419, 451, 447, 412, 446

[56] References Cited

U.S. PATENT DOCUMENTS

| | | | |
|---|---|---|---|
| 2,952,600 | 9/1960 | Newson | 376/333 |
| 3,459,636 | 8/1969 | Germer | 376/451 |
| 3,510,398 | 5/1970 | Wood | 376/327 |
| 3,669,833 | 6/1972 | Boeck et al. | 376/426 |
| 3,679,545 | 7/1972 | Leirvik | 376/426 |
| 3,734,825 | 5/1973 | Schabert et al. | 376/327 |
| 3,801,449 | 4/1974 | Cayol | 376/412 |
| 3,948,628 | 4/1976 | McGuire | 376/327 |
| 4,609,524 | 9/1986 | Ferrari | 376/327 |
| 4,629,599 | 12/1986 | Crowther et al. | 376/419 |
| 4,637,915 | 1/1987 | Camden, Jr. et al. | 376/447 |
| 4,642,216 | 2/1987 | Orr et al. | 376/327 |
| 4,668,468 | 5/1987 | Santucci | 376/419 |
| 4,696,793 | 9/1987 | Paul et al. | 376/447 |

FOREIGN PATENT DOCUMENTS

| | | | |
|---|---|---|---|
| 51-49398 | 4/1976 | Japan | 376/327 |
| 0025995 | 2/1977 | Japan | 376/327 |
| 0128483 | 7/1984 | Japan | 376/327 |

Primary Examiner—Harvey E. Behrend

[57] ABSTRACT

A cluster of standardized reduced length burnable absorber rods include a plurality of middle rod sections having a multiplicity of different axial lengths and containing burnable absorber material in sealed chambers therein, a plurality of upper end spacer sections having a multiplicity of different axial lengths and each defining an empty space, and a plurality of lower end spacer sections having a multiplicity of different axial lengths and each defining an empty space. Each of the rods is formed of one middle rod section tandemly arranged between and rigidly interconnecting one upper end spacer section and one lower end spacer section. The three rigidly interconnected sections which form each rod being selected so as to provide the same standard combined axial length for each of the rods in the cluster thereof although the axial lengths of the middle rod sections can vary from rod to rod and thereby the axial location of the burnable absorber material along the rod can also vary from rod to rod.

3 Claims, 4 Drawing Sheets

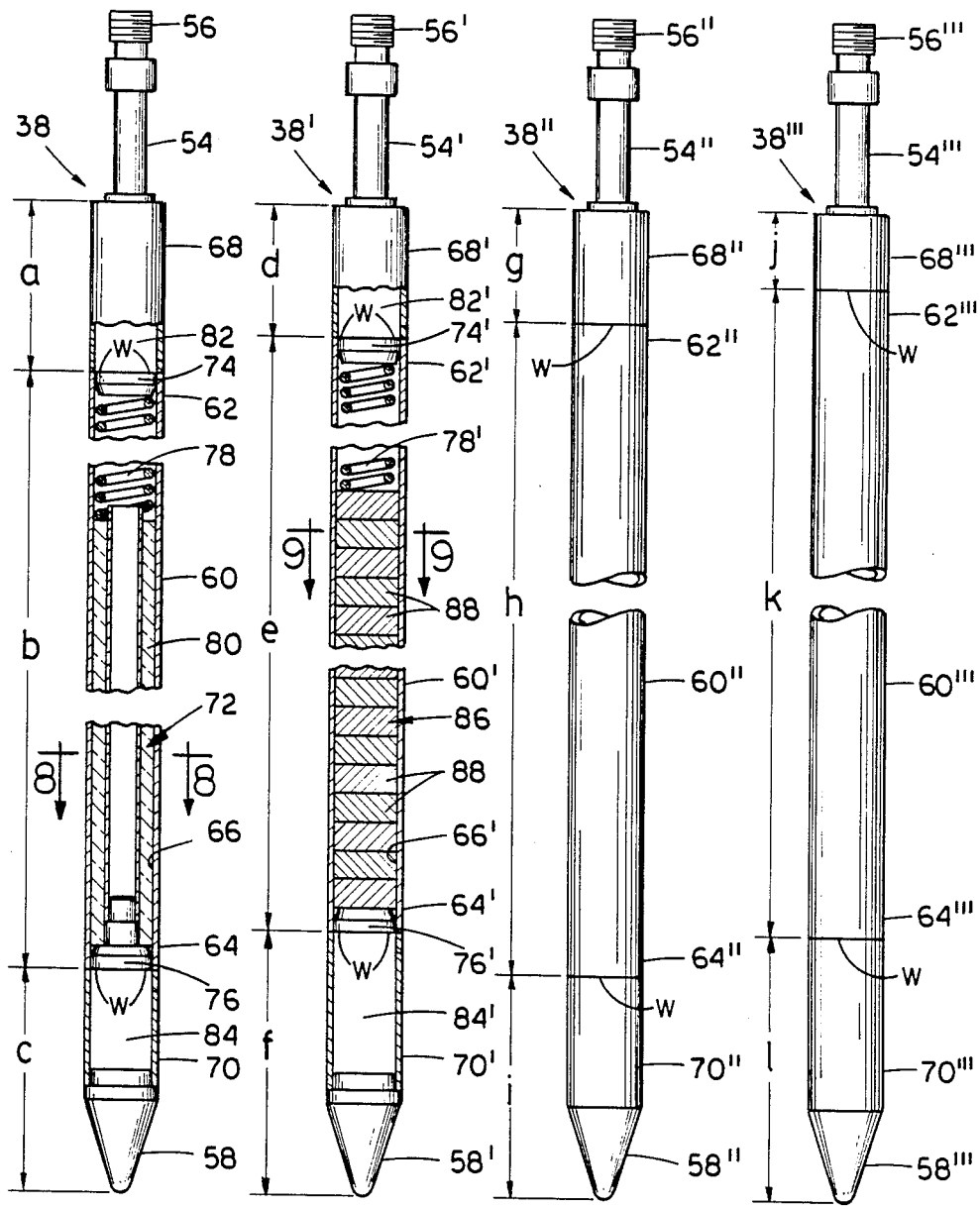

STANDARDIZED REDUCED LENGTH BURNABLE ABSORBER RODS FOR A NUCLEAR REACTOR

CROSS REFERENCE TO RELATED APPLICATIONS

This is a divisional of co-pending application Ser. No. 718,902 filed on 4-1-85 U.S. Pat. No. 4,728,487 issued 3-1-88.

Reference is hereby made to the following copending U.S. applications dealing with related subject matter and assigned to the assignee of the subject application:

1. "Light Water Moderator Filled Rod For A Nuclear Reactor" by P. K. Doshi et al, assigned U. S. Ser. No. 654,709, and filed Sept. 26, 1984 (W. E. 52,140).

2. "Soluble Burnable Absorber Rod For A Nuclear Reactor" by P. K. Doshi et al, assigned U.S. Ser. No. 654,625 and filed Sept. 26, 1984 (W. E. 52,141).

BACKGROUND OF THE INVENTION

1. Field of the Invention

The present invention relates generally to nuclear reactors and, more particularly, is concerned with a unique design concept for burnable absorber rods which provides rods of an overall standardized length while simulating conventional custom-designed rods which have a variety of reduced lengths.

2. Description of the Prior Art

In a typical nuclear reactor, the reactor core includes a large number of fuel assemblies each of which is composed of top and bottom nozzles with a plurality of elongated transversely spaced guide thimbles extending between the nozzles and a plurality of transverse grids axially spaced along the guide thimbles. Also, each fuel assembly is composed of a plurality of elongated fuel elements or rods transversely spaced apart from one another and from the guide thimbles and supported by the grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles.

Also, it is conventional practice to design an excessive amount of neutron flux into the reactor core at start-up so that as the flux is depleted over the life of the core there will still be sufficient reactivity to sustain core operation over a long period of time. In view of this practice, in some reactor applications burnable absorber or poison rods are inserted within the guide thimbles of some fuel assemblies to assist the control rods in the guide thimbles of other fuel assemblies in maintaining the neutron flux or reactivity of the reactor core relatively constant over its lifetime. The burnable poison rods, like the control rods, contain neutron absorber material. They differ from the control rods mainly in that they are maintained in stationary positions within the guide thimbles during their period of use in the core. The overall advantages to be gained in using burnable poison rods at stationary positions in a nuclear reactor core are described in U.S. Pat. Nos. to Rose (3,361,857) and to Wood (3,510,398).

U.S. Pat. Nos. 4,169,759 and 4,169,760 to Bevilacqua describe the use of a first group of full length control rods insertable into a nuclear reactor core for normal control of reactor power and of a second group of part length control rods insertable into the core for control of power oscillations. The part length control rod has first and second ends with a first neutron absorbing material at its first end, a second neutron absorbing material at its second end spaced from the first neutron absorbing material by a distance less than the length of the core, and a third intermediate portion connecting the first and second neutron absorbing material, the intermediate material being substantially non-neutron absorbing. The first neutron absorbing material is normally positioned outside of the reactor core where it has little or no effect on the neutron flux of the reactor core, while the second neutron absorbing material is normally positioned in the central region of the core for control of power oscillation. Upon the requirement for a rapid reactor shutdown, the part length control rod is scrammed or inserted into the core so that both first and second ends of the control rod are present in the core.

The current trend in reactor core power distribution control is toward the use of burnable absorber rods having reduced lengths for the maximization of peaking factor margin. This approach involves the provision of custom-designed lengths and placements of the reduced length burnable absorber or poison rods. However, such approach presents some potentially significant manufacturing and handling difficulties. First, it precludes the manufacturing facility from being able to build rods from a standard inventory and can require a significant additional non-standard inventory (to cover manufacturing yield problems) that is unusable after completion of the reduced length rods for one particular reload region of the core. Second, handling of reduced length burnable absorber rod clusters when loading or unloading the reactor core entails considerable difficulty. Because of the design of the burnable absorber rod cluster handling tool, it is a very difficult task to be able to deal with clusters of a length different from that originally assumed in the design of the tool. It is doubly difficult because the cluster is sufficiently delicate that handling it improperly can result in damage, which could result in a delay in restarting the reactor.

Consequently, a need exists for a different approach to burnable absorber rod design which will retain the flexibility of custom-designed reduced length burnable absorber rods in terms of maximizing reactor core power distribution control capability while, if not eliminating, at least reducing the above-described difficulties encountered in the manufacturing and handling of these custom-designed rods.

SUMMARY OF THE INVENTION

The present invention provides a standardized length burnable absorber rod designed to satisfy the aforementioned needs. The standardized rod is composed of three separate parts which, when assembled from standardized pre-manufactured parts, provides the reactor core power distribution control capability of the custom-designed reduced length burnable absorber rod that has been available heretofore. The standardized design concept of the present invention provides several advantages over the custom-designed or custom-fit concept. First, the absorber section, which is typically the most expensive part, can be provided as a small set of standard lengths, enabling the manufacturing facility to build from standardized inventory without sacrificing the peaking factor margin of the custom-fit design. Second, all burnable absorber rods will always be of the same overall length, eliminating any problems with handling. Third, providing the right kind of reduced length burnable absorber rod in an emergency situation becomes a matter of the assembly, rather than the manufacture, of the rod which drastically reduces emergency response time.

Accordingly, the present invention sets forth for use in a fuel assembly for a nuclear reactor a standardized reduced length burnable absorber rod, comprising: (a) an upper end plug; (b) a lower end plug; (c) an elongated middle tubular section having opposite upper and lower ends and a chamber defined therein between the opposite ends; (d) a burnable absorber material disposed in the chamber of the middle tubular section; (e) an elongated upper tubular extension extending between and rigidly interconnecting the upper end plug and the upper end of the middle tubular extension; and (f) an elongated lower tubular extension extending between and rigidly interconnecting the lower end plug and the lower end of the middle tubular section. Still further, the standardized rod includes a pair of upper and lower end caps, the upper end cap being attached to the upper end of the middle tubular section so as to seal the same and the lower end cap being attached to the lower end of the middle tubular section so as to seal the same.

More particularly, the upper tubular extension of the standardized rod has a hollow chamber formed therein which defines an upper space extending between the upper end plug and the upper end cap on the upper end of the middle tubular section. Similarly, the lower tubular extension of the standardized rod has a hollow chamber formed therein which defines a lower space of a predetermined axial length extending between the lower end plug and the lower end cap on the lower end of the middle tubular section. Each of the upper and lower tubular extensions and the middle tubular sections has one of a plurality of known different standard axial lengths being selected so that the upper and lower tubular extensions and middle tubular section when interconnected together will have a combined standard axial length which is the same from rod to rod.

The present invention also relates to a cluster of standardized reduced length burnable absorber rods for use in a fuel assembly of a nuclear reactor, comprising: (a) a plurality of middle rod sections having a multiplicity of different axial lengths and containing burnable absorber material; (b) a plurality of upper end spacer sections having a multiplicity of different axial lengths; and (c) a plurality of lower end spacer sections having a multiplicity of different axial lengths; (d) each of the rods being formed of one middle rod section tandemly arranged between and rigidly interconnecting one upper end spacer section and one lower end spacer end section, the rigidly interconnected sections which form each rod being selected so as to provide the same standard combined axial length for each of the rods although the axial lengths of the middle rod sections can vary from rod to rod whereby the axial location of the burnable absorber material along the rod can also vary from rod to rod. Also, each of the middle rod sections has a sealed chamber defined therein for containing the burnable absorber material. Additionally, each of the rods has an upper end plug on the upper end spacer section and a lower end plug on the lower end spacer section. Each of the upper end spacer sections defines an upper empty space between the upper end plug and the middle rod section of the rod, while each of the lower end spacer sections defines a lower empty space between the lower end plug and the middle rod section of the rod.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIGS. 4 and 5 are enlarged elevational views of different embodiments of the standardized length rod of the present invention having different kinds of neutron absorber material therein and showing the rods in vertically foreshortened, longitudinally sectioned form.

FIGS. 6 and 7 are enlarged elevational views of different embodiments of the standardized length rod of the present invention with the lengths of the three sections comprising each rod being different with respect to some sections and the same with respect to other sections while the overall lengths of the rods are equal.

FIG. 8 is a sectional view of the standardized length rod embodiment of FIG. 4 as taken along line 8—8 therein.

FIG. 9 is a sectional view of the standardized length rod embodiment of FIG. 5 as taken along line 9—9 therein.

DETAILED DESCRIPTION OF THE INVENTION

Figure 1:
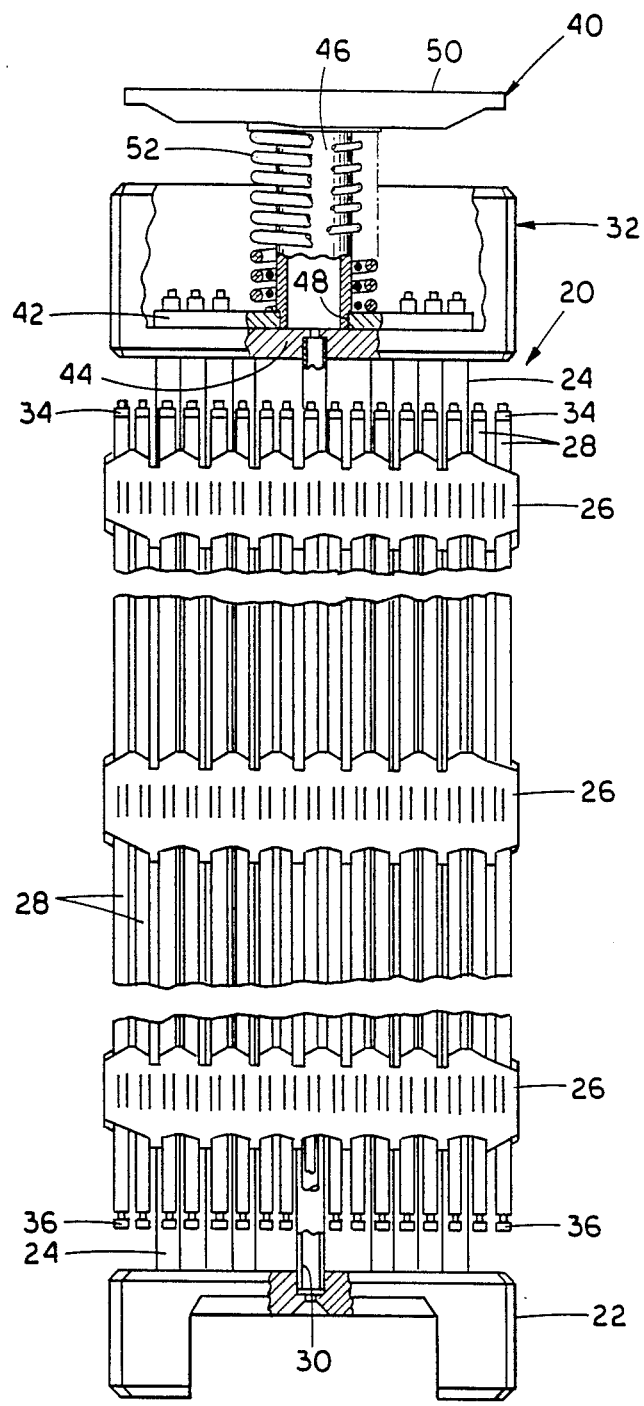
FIG. 1 is an elevational view, partly in section, of a fuel assembly which incorporates a cluster of standardized length burnable absorber rods of the present invention, the assembly being (illustrated) in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a fuel assembly, represented in vertically foreshortened form and being generally designated by the numeral 20. The fuel assembly 20 is the type used in a pressurized water reactor (PWR) and basically includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and the opposite ends of the rod are closed by upper and lower end plugs 34,36. The fuel pellets composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

STANDARDIZED REDUCED LENGTH BURNABLE ABSORBER RODS

In the operation of a PWR it is desirable to prolong the life of the reactor core as long as feasible to better utilize the uranium fuel and thereby reduce fuel costs. To attain this objective, it is common practice to provide an excess of reactivity initially in the reactor core and, at the same time, provide means to maintain the reactivity relatively constant over its lifetime.

The present invention relates to such means in the form of a cluster of standardized reduced length burnable absorber rods 38, as seen in FIG. 1, inserted in the guide thimbles 24. The cluster of standardized rods 38 are stationarily supported by a holddown assembly 40 in the guide thimbles 24 of some of the fuel assemblies 20 to assist the movable control rods (not shown) in the guide thimbles 24 of other fuel assemblies (not shown) in maintaining a substantially constant level of neutron flux or reactivity in the core throughout its operating cycle.

Heretofore, burnable absorber or poison rods have lately been of a custom-designed reduced length construction for maximization of the peaking factor margin in the reactor core. However, these latter reduced length rods have created other problems in their manufacture and handling, as discussed earlier. The standardized reduced length rod 38 of the present invention has substantially eliminated the drawbacks of the prior art rod while retaining its advantages.

Figure 3:
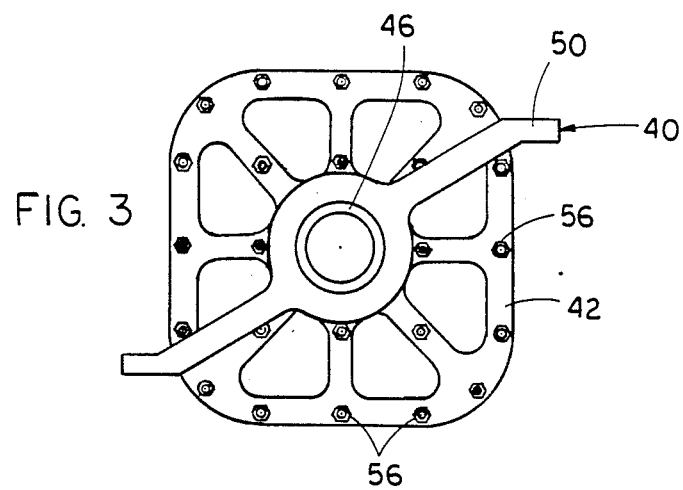
FIG. 3 is a top plan view of the rod cluster as seen along line 3—3 of FIG. 2.
Figure 2:
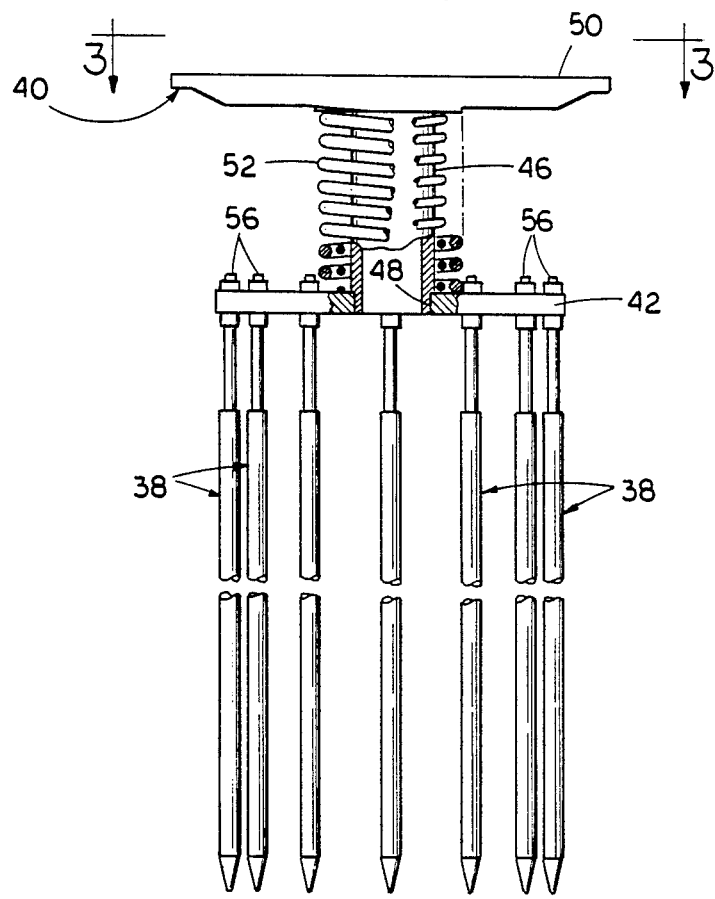
FIG. 2 is an enlarged elevational view of the standardized length burnable absorber rod cluster of FIG. 1 removed from the fuel assembly, showing the rod cluster in vertically foreshortened and partly sectioned form.

Referring now to FIGS. 2 and 3, in addition to FIG. 1, the holddown assembly 40 which supports the standardized rods 38 in spaced side-by-side relationship includes a lower flat perforated support plate 42 which fits within the fuel assembly top nozzle 32 and rests on the adapter plate 44 of the top nozzle. The holddown assembly 40 also includes a sleeve 46, being attached at its lower end within a central opening 48 in the support plate 42 and extending upwardly therefrom, and an upper holddown plate 50 which receives the sleeve 46 and is slidable vertically along it. Further, a holddown coil spring 52 is disposed about the sleeve 46 and extends between the lower support plate 42 and the upper holddown plate 50. Thus, the support plate 42 is held down against the top nozzle adapter plate 44 by the coil spring 52 which is compressed by the upper core plate (not shown) acting through the upper holddown plate 50 which abuts the upper core plate. This arrangement assures that the standardized rods 38 which are attached to the support plate 42 cannot be ejected from the reactor core by coolant flow forces while any thermal growth of the rods is accommodated.

Turning next to FIG. 4, there is shown one embodiment of the standardized reduced length burnable absorber rod 38 of the present invention. The standardized rod 38 basically includes an upper end plug 54 having a threaded upper end 56 by which means the rod is connected to the support plate 42, a lower end plug 58, an elongated middle tubular rod section 60 having opposite upper and lower ends 62,64 and a chamber 66 defined therein between the opposite ends 62,64, an upper end spacer section 68 in the form of an elongated tubular extension extending between and rigidly interconnecting the upper end plug 54 and the upper end 62 of the middle tubular section 60, and a lower end spacer section 70 in the form of an elongated tubular extension extending between and rigidly interconnecting the lower end plug 58 and the lower end 64 of the middle tubular section 60. The interconnection can take any suitable form, for instance, screw threaded, welded of crimped connections. By way of example, the sections 68,60,70 are shown welded together in FIGS. 4-7

Also, the standardized rod 38 has a burnable absorber material 72 disposed in the chamber 66 of the middle tubular section 60 and a pair of upper and lower end caps 74,76 which seal the chamber 66. Specifically, the upper end cap 74 is spaced below the upper end plug 54 and attached in any suitable manner, such as by welding, to the upper end 62 of the middle tubular section 60 so as to seal the chamber 66 at the upper end 62, while the lower end cap 76 is spaced above the lower end plug 58 and attached also in any suitable manner, such as by welding, to the lower end 64 of the middle tubular section 60 so as to seal the chamber 66 at the lower end 64. Also, preferably a coil spring 78 is disposed in the chamber 66 of the middle tubular section 60 between the upper end cap 74 and the burnable absorber material 72 contained in the chamber 66 for maintaining the material in a stationary position within the chamber. In the one embodiment of the standardized rod 38 of FIGS. 4 and 8, the burnable absorber material 72 is in the form of a borosilicate glass tube 80 disposed in the chamber 66 of the middle tubular section 60 between its upper and lower end caps 74,76.

The upper end spacer section or tubular extension 68 of the standardized rod 38 has a hollow chamber 82 formed therein which defines an upper space extending on the upper end 62 of the middle tubular section 60 of the rod 38. Similarly, the lower end spacer section or tubular extension 70 of the standardized rod 38 has a hollow chamber 84 formed therein which defines a lower space extending between the lower end plug 58 and the lower end cap 76 of the middle tubular section 60 of the rod 38. The purpose of the spacer sections 68,70 will become clear hereinafter.

Another embodiment of the standardized rod 38' is illustrated in FIGS. 5 and 9. It only differs from the construction of the rod of FIGS. 4 and 8 in the particular burnable absorber material 86 being used therein, such being in the form of a stack of pellets 88 containing a boron compound, $B_4C$, and the specific axial lengths of the three sections of the rod. All of the remaining parts of the rod of FIG. 5 which are substantially the same as those of FIG. 4 are identified with the same reference numeral followed by a single prime mark. The embodiments of FIGS. 6 and 7 are identified similarly with double and triple prime marks being used in the respective figures.

With respect to the standardized rods 38, 38', 38", 38''' of FIGS. 4 to 7, their upper and lower end spacer sections 68,70; 68',70'; 68",70"; and 68''', 70''' and the middle tubular sections 60,60',60",60''' each has one of a plurality of known different standard axial lengths being selected so that the upper and lower tubular extensions and middle tubular sections when rigidly interconnected together to form any one rod will have a combined axial length which is the same from rod to rod. However, in view that the axial lengths of the middle sections 60,60', 60",60''' of each rod can differ, the rod in effect simulates the prior art custom-designed reduced length rod. The upper and lower end spacer sections are selected to have certain axial lengths in view of the length of the middle section in order to ensure that the overall axial length of the rod will meet the desired standard length. Thus, the end spacer sections merely define empty space of varying axial lengths at the opposite ends depending on the length of the burnable absorber material in the middle section. In FIGS. 4 to 8, none of the axial lengths a, d, g, j of the upper end spacer sections 68,68',68",68''' of the standardized rods are equal. On the other hand, the axial lengths b and e of the middle sections 60, 60' are equal as are the axial lengths h and k of the middle sections 60", 60'''. Finally, the axial lengths c and i of the combined lower end spacer sections and lower end plugs 70,58 and 70",58" are equal as are the axial lengths f and l of the combined lower end spacer sections and lower end plugs 70',58' and 70''',58'''.

With such variability in the axial lengths of the individual sections making up the rods 38 in a cluster thereof, it is readily seen that the axial location of the burnable absorber material can be different from rod to rod, although not necessarily different for every one of the rods. Each rod can be fitted with upper and lower end spacer sections of appropriate axial lengths selected from a number of different standard axial lengths available so that together with a middle section of any one of several different standard axial lengths, an overall rod is assembled having the same length as every other rod regardless of its absorber length or placement. With respect to adjacent rods, the upper and lower ends of the middle sections which contain the absorber material do not normally align with one another and thus provide a "ragged edge" at both the upper and lower ends. The "ragged edge" of the standardized rods of the present invention provides a smoother transition of material characteristics if the maximum peaking factor should occur at such interfaces than in the case of the aligned edge of the custom-fit reduced length rods of the prior art, which provides a significant reduction in the peaking power.

Figure 10:
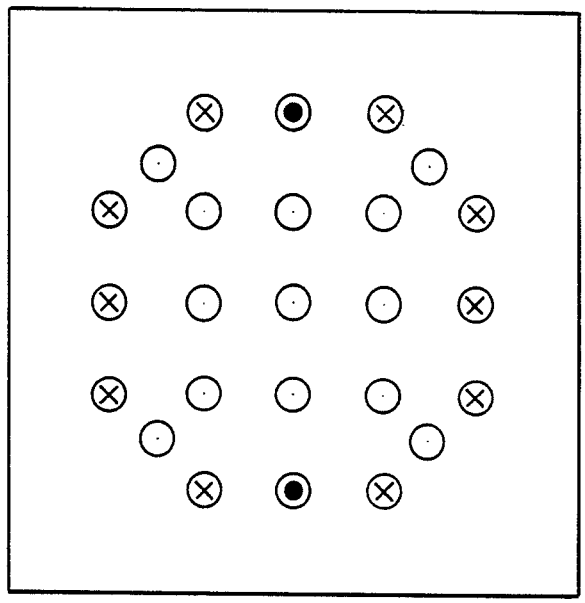
FIG. 10 is a schematic plan view of one embodiment of a mixed cluster of standardized length rods wherein the rods, include intermediate burnable absorber material sections of one combination of different standard lengths.
Figure 11:
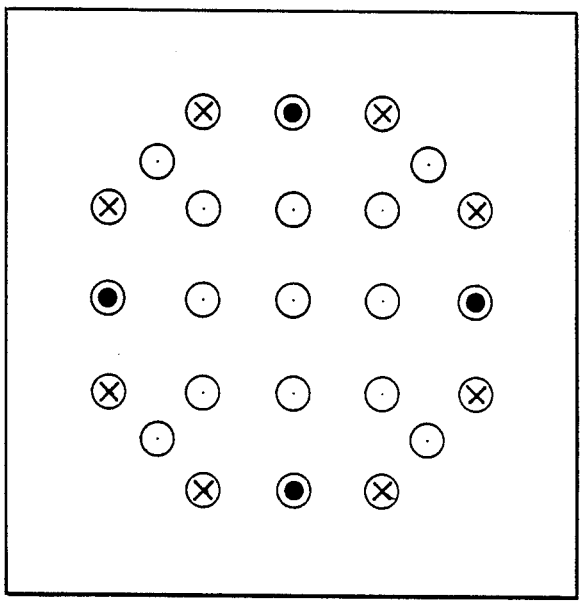
FIG. 11 is a schematic plan view of another embodiment of a mixed cluster of standardized length rods wherein the rods include intermediate burnable absorber material sections of another combination of different standard lengths.

FIGS. 10 and 11 show two different patterns of mixed clusters of standardized rods having burnable absorber middle sections of two different axial lengths. In FIG. 10, circles marked with an "x" signify rods having absorber material of one reduced length, such as 104 inches (or 264.16 centimeters), and circles marked with a dot "." signify rods having absorber material of another reduced length, such as 134 inches (or 340.36 centimeters), whereby the effective average axial length of the absorber material across the cluster is 108 inches (or 274.32 centimeters). In FIG. 11, circles marked with an "x" signify rods having absorber material, for instance, of an axial length of 108 inches (or 274.32 centimeters), whereas circles marked with a dot "." signify rods having absorber material of 120 inches (or 304.8 centimeters) in axial length, for an effective average axial length of 110 inches (or 279.4 centimeters) of absorber material across the cluster.

It is thought that the standardized reduced length burnable absorber rod of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A cluster of burnable poison type control rods useful in a fuel assembly of a nuclear reactor, said cluster of rods comprising:
   (a) a common support member; and
   (b) a plurality of burnable poison type control rods supported by and depending from said common support member;
   (c) each burnable poison type control rod being composed of an upper end portion, an intermediate portion and a lower end portion;
   (d) each upper end portion including an upper end plug and an elongated upper hollow tubular extension having opposite upper and lower ends with said upper end plug sealably and rigidly connected to said upper end thereof;
   (e) each lower end portion including a lower end plug and an elongated lower hollow tubular extension having opposite upper and lower ends with said lower end plug sealably and rigidly connected to said lower end thereof;
   (f) each intermediate portion including an elongated middle hollow tubular section having opposite upper and lower ends and a chamber defined therein between said opposite ends, a pair of upper and lower end caps rigidly attached respectively to said upper and lower ends of said middle section so as to seal said chamber, and a burnable poison material disposed in said chamber of said middle tubular section, said upper and lower hollow tubular extensions being devoid of nuclear fuel material and burnable poison material;

(g) each burnable poison type control rod being further composed of upper and lower connections respectively fixedly connecting said upper and lower end portions of said each control rod to said intermediate portion of said each control rod by rigidly connecting said upper end portion tubular extension at said lower end thereof and said lower end portion tubular extension at said upper end thereof respectively with said upper end and said lower end of said middle tubular section adjacent said respective upper end cap and lower end cap thereof;

(h) said middle tubular sections having a multiplicity of different axial lengths, said upper tubular extensions having a multiplicity of different axial lengths; and said lower tubular extensions having a multiplicity of different axial lengths such that said interconnected middle tubular section and upper and lower tubular extensions of said control rods provide said control rods with the same overall axial lengths although said axial lengths of said middle tubular sections can vary from control rod to control rod whereby the axial locations of said burnable poison material in said middle tubular section chambers along control rods can also vary from rod to rod.

2. The cluster of poison type control rods as recited in claim 1, wherein each of said middle tubular sections of said control rod intermediate portions includes a spring disposed in said chamber thereof between one of said upper and lower end caps and said burnable poison material contained in said chamber.

3. The cluster of poison type control rods as recited in claim 1, wherein each of said upper end tubular extensions defines an upper empty space between said upper end plug and said middle tubular section of said control rod, while each of said lower end tubular extensions defines a lower empty space between said lower end plug and said middle tubular section of said control rod.

* * * * *